April 5, 1955  E. G. FAHLMAN ET AL  2,705,667
PISTONS
Filed April 28, 1953  2 Sheets-Sheet 1
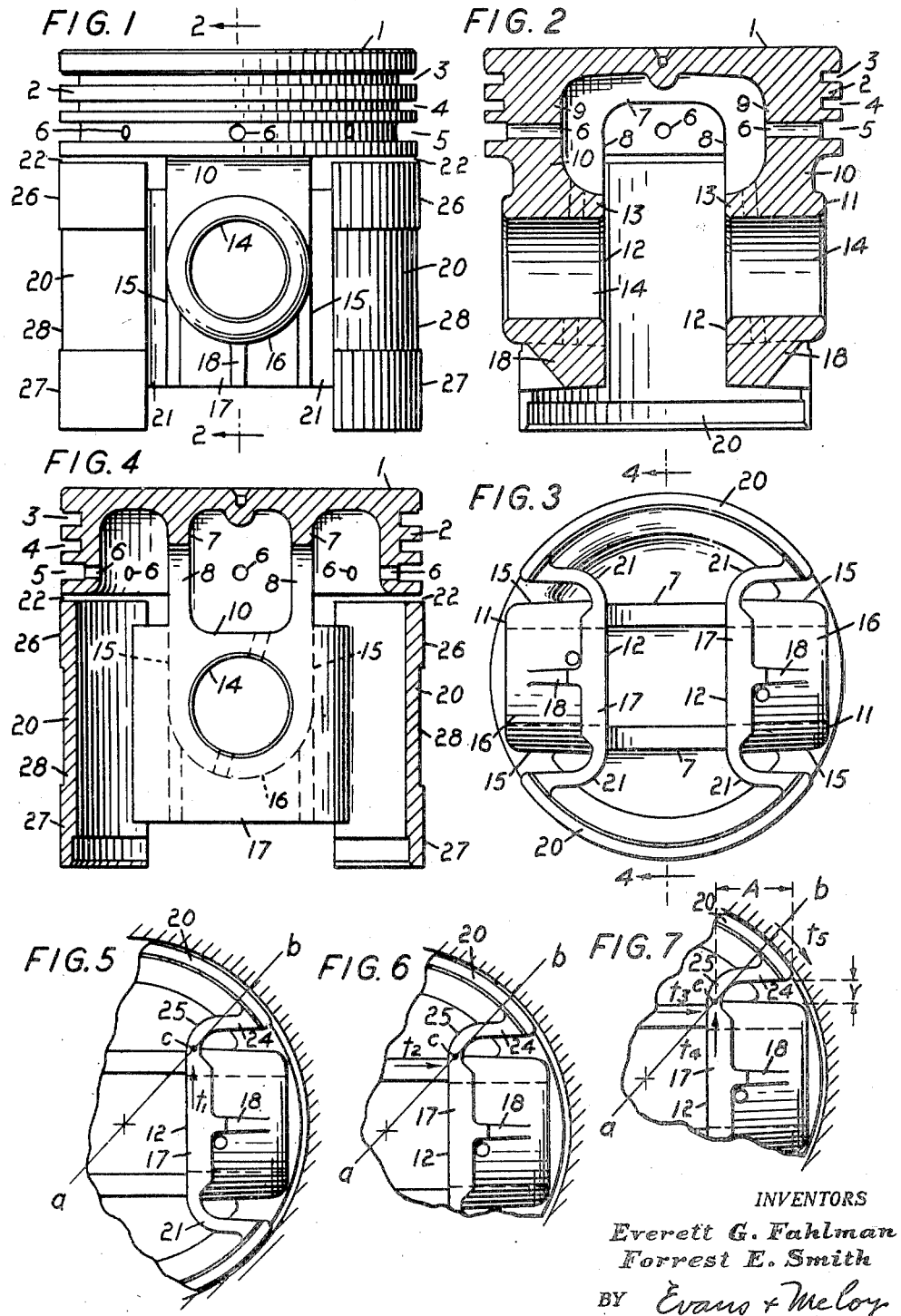
INVENTORS
Everett G. Fahlman
Forrest E. Smith
BY Evans + McCoy
ATTORNEYS

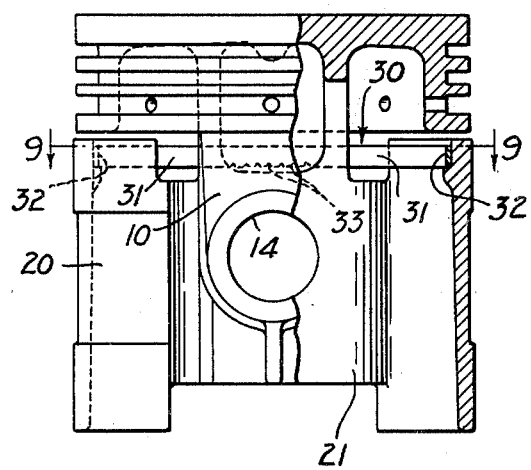
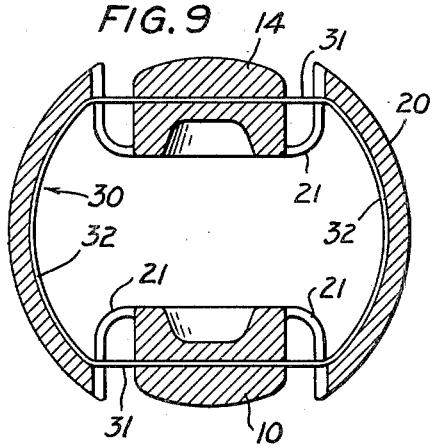
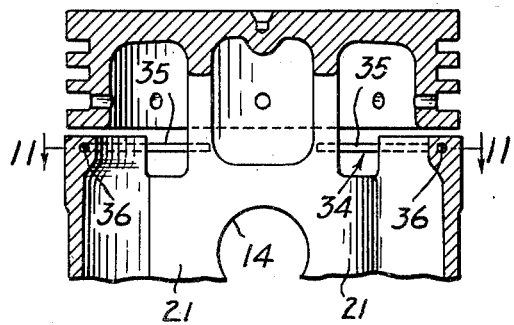
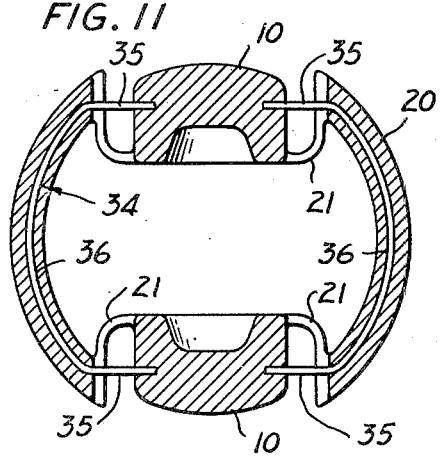
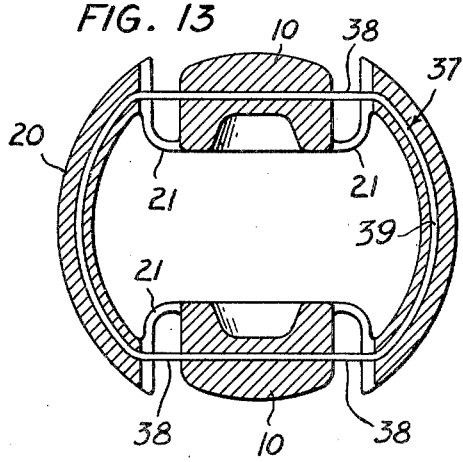
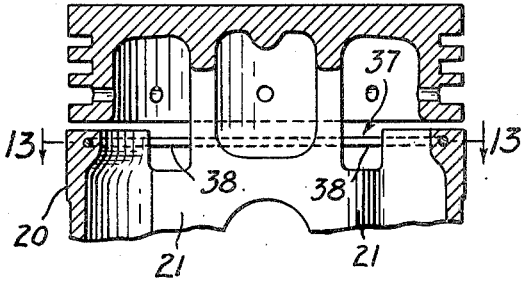
INVENTOR
Everett G. Fahlman
Forrest E. Smith
BY Evans + McCoy
ATTORNEYS

United States Patent Office 2,705,667
Patented Apr. 5, 1955

2,705,667

PISTONS

Everett G. Fahlman, Medina, and Forrest E. Smith, West Richfield, Ohio, assignors to The Permold Company, Medina, Ohio, a corporation of Ohio Application April 28, 1953, Serial No. 351,577

10 Claims. (Cl. 309—11)

This invention relates to pistons for internal combustion engines and particularly to cast metal pistons formed of light metal alloys such as alloys of aluminum or magnesium, this application being a continuation-in-part of our application Serial No. 175,678, filed July 25, 1950, now abandoned.

Aluminum alloys have coefficients of expansion which are relatively high as compared to the metal of internal combustion engine cylinders and must, therefore, be so designed that they will operate in the cylinders when expanded by heat.

It has been found to be essential that aluminum alloy pistons have skirt portions of a rigidity sufficient to withstand operational thrusts without appreciable yielding and it has been the usual practice to construct pistons with relatively rigid skirts having bearing faces that are cam ground to provide a clearance between the bearing faces and the cylinder wall that is greatest in the portions of the skirt nearest the plane of the piston and wrist pin axes.

Theoretically the cam ground faces of such pistons are of a shape such that they will become substantially round and have substantially full engagement with the cylinder wall at a predetermined operating temperature. In practice, however, it has been necessary to provide an undesirable amount of additional clearance to avoid freezing in the cylinder in the event that the piston should become heated to a temperature in excess of the predetermined operating temperature. Because of the excessive clearance necessary for cam ground pistons it is difficult to avoid noisy operation and excessive wear on the piston skirt at the points where the out of round bearing surfaces have contact with the cylinder wall. Such large clearances which permit rocking of the piston in the bore cause the faces of the piston rings to wear rounded, and such rocking also causes excessive wear on the ring groove side walls.

The piston of the present invention has two arcuate skirt sections that are separated from the head of the piston and that are supported by two rigid bearing posts of uniform width that are integral with the head and provided with alined wrist pin openings. The skirt sections are supported by four struts integral with the posts and with the skirt sections. The struts are elongated and extend parallel to the piston axis, being of substantially uniform transverse section.

The skirt sections have bearing faces machined to conform to a cylindrical surface of revolution and the struts, which are relatively rigid and which extend throughout the major portion of the length of the skirt, have sufficient yieldability to permit the piston to accommodate itself to the cylinder wall without binding when expanded by heat.

In order to obtain the desired yieldability in an aluminum alloy suitable for pistons, we have found it to be advantageous to heat-treat the metal of the piston after casting to decrease its hardness and increase its flexibility.

In pistons for high speed, high compression engines, bracing members are provided that are interposed between the lateral edges of the skirt sections and the adjacent bearing posts to resist thrusts tending to force a skirt section toward the bearing posts.

Each bracing member is in the form of a resilient metal brace bar that extends across the space between a bearing post and the lateral edge of a skirt section above the wrist pin opening of the posts at right angles to the plane of the piston and wrist pin axes. The bracing members effectively resist operational thrusts and limit the flexing of the struts toward the bearing posts. Because of their resiliency and lateral flexibility the brace members have some cushioning action and do not appreciably hinder the slight flexing of the struts and skirt sections necessary to accommodate the skirt bearing surfaces to the cylinder wall at different operating temperatures. The bracing members, however, do limit the inward flexing of the struts under extreme lateral operating thrusts so that the metal of the struts is not impaired by excessive flexing under severe operating conditions.

The present invention has for an object to provide a piston having a skirt that requires no cam grinding, that has truly round bearing surfaces and that has substantially full engagement with the cylinder walls at all temperatures of operation.

It is also an object of the invention to provide a piston in which the skirt and skirt supports have the necessary structural rigidity to resist the lateral thrusts to which it is subjected during operation without appreciable yielding, and also have sufficient flexibility to permit the skirt to conform to the cylinder without harmful binding when the piston is expanded by heat.

The present invention also has for an object to provide relatively rigid skirt supporting struts so connected to rigid wrist pin bearing posts and to the skirt and so shaped that full engagement between the skirt bearing surfaces and the cylinder wall is maintained and thrusts on the cylinder wall due to expansion of the piston by heat are distributed substantially uniformly throughout the bearing faces of the skirts.

It is an additional object of the invention to provide relatively rigid skirt supporting struts each of which has angularly disposed arms connected one to a skirt section and the other to the bearing post in such manner that a piston with a strut that has the desired yieldability upon expansion of the piston in the engine cylinder may be obtained by providing the proper ratio between the lengths of the strut arms.

The present invention has for a further object to provide skirt supporting struts which extend throughout the major portion of the length of the skirt which have substantially uniform flexing characteristics throughout their length and which provide for radial yieldability of the skirt at the juncture of the struts with the skirt under any lateral thrust on the bearing portion of the skirt.

It is an important object of the invention to provide a piston for internal combustion engines that has long life and that will maintain high compression with minimum oil leakage for long periods of time.

It is also an object of the invention to provide means for limiting the amplitude of flexure of the struts so that the metal of the struts will not be fatigued by repeated flexing under severe operating conditions.

With the above and other objects in view, the invention may be said to comprise the piston as illustrated in the accompanying drawings and hereinafter described, together with such variations and modifications thereof as will be apparent to one skilled in the art to which the invention pertains.

Reference should be had to the accompanying drawings forming a part of this specification in which:

Figure 1 is a side elevation of the piston embodying the invention;

Fig. 2 is an axial section taken on the line indicated at 2—2 in Fig. 1;

Fig. 3 is a bottom plan view of a piston;

Fig. 4 is an axial section taken on the line indicated at 4—4 in Fig. 3;

Figs. 5, 6 and 7 are fragmentary diagrammatic views indicating the action of thrusts transmitted through a skirt supporting strut and a skirt section to the cylinder wall upon the skirt supporting strut; Fig. 5 indicating the manner in which a lateral thrust is imposed upon the strut when the piston rod is in an inclined position, Fig. 6 indicating a lateral thrust on the strut in the direction of the wrist pin axis such as may be exerted when the wrist pin or piston rod bearings are loose or misalined, and Fig. 7 indicating thrusts exerted on the strut due to expansion of the piston by heat;

Fig. 8 is a view partly in side elevation and partly in vertical section showing a modification of the invention in which an auxiliary bracing means is employed;

Fig. 9 is a horizontal section taken on the line indicated at 9—9 in Fig. 8;

Fig. 10 is a vertical section showing a piston with a modified form of bracing means;

Fig. 11 is a horizontal section taken on the line indicated at 11—11 in Fig. 10;

Fig. 12 is a vertical section showing a piston provided with another form of bracing means; and Fig. 13 is a horizontal section taken on the line indicated at 13—13 in Fig. 12.

As illustrated in the accompanying drawings, the piston of the present invention has a head 1 provided with a circumferential flange 2 forming a ring belt provided with axially spaced grooves 3, 4 and 5 to receive conventional piston rings. The flange 2 may be provided with holes 6 for return of oil to the interior of the piston and thence to the oil reservoir.

In the piston herein illustrated the head 1 is provided interiorly with spaced transverse stiffening ribs 7 which are parallel and at equal distances from the axis of the head, the ribs 7 extending across the inner face of the head inwardly of the flange 2 and joining at their ends with ribs 8 that are integral with and project inwardly from the flange 2. The ribs 8 are alined with the ribs 7 and the portion 9 of the flange 2 to which the ribs 8 are joined is much thicker than other portions thereof to provide a rigid base for posts 10 which receive the wrist pin and support the piston skirt. The posts 10 are of substantially uniform width throughout their length, the sides of their base portions being the outer faces of the ribs 8. The bearing posts 10 have outer faces 11 which are inset slightly with respect to the cylindrical outer face of the flange 2, the posts 10 having inner faces 12 which are substantially flat and which are disposed at equal distances from the axis of the piston.

The posts 10 have radially thickened portions 13 provided with axially alined wrist pin openings 14. The space between the inner ends of the wrist pin receiving portions 13 of the post is determined by the width of the end of the connecting rod through which the wrist pin extends and it may be desirable in some instances to extend the wrist pin receiving portion 13 past the rear face 12 of the post 10. The openings 14 are disposed centrally of the posts 10 midway between and parallel to side faces 15 of the posts which are extensions of the outer side faces of the rib 8 and are positioned to support the wrist pin with its axis intersecting the axis of the piston at right angles thereto. The thickened portions 13 of the posts 10 are provided with rounded end faces 16 extending inwardly from the outer faces 11, and the posts have rigid end portions 17 inwardly of the rounded faces 16 which are of the same width as the base portions of the posts, which are braced by gussets 18.

The piston has skirt sections 20 that are supported from the bearing posts 10 by struts 21 that are integrally joined to edges of the skirt sections and to side edges of the posts 10 adjacent the rear faces 12 thereof, the skirt sections 20 being separated from the head 1 by a slot 22. The skirt sections have the flexibility that is necessary to permit them to maintain substantially full engagement with the cylinder wall when expanded by heat.

The struts 21 are integrally joined to the posts 10 and skirt sections 20 along lines parallel to the piston axis and are of substantially uniform width, thickness and cross sectional shape throughout their length, the struts 21 extending from near the inner ends of the skirt sections 20 to near the outer ends thereof. The posts 10 being rigid and the skirt sections 20 being in engagement with rigid cylinder walls, the flexing of the piston due to operational thrusts and expansion thrusts is confined to the struts 21 except for the slight flexing of the skirt.

Each of the struts 21 has a substantially flat outer portion 24 that is disposed substantially parallel to the wrist pin axis and a curved inner portion 25 that is joined to the opposite sides of the posts 10 along opposite sides thereof adjacent their inner faces 12. The struts provide a support of substantially uniform rigidity throughout the major portion of the axial length of the skirts and these struts are also so formed that they provide the radial yieldabilty at their junctures with the skirt sections necessary to distribute the pressure on the cylinder wall throughout the bearing face of the skirt sections when the skirt sections are subjected to operational and heat expansion thrusts.

The thrusts exerted through the struts 21 to the skirt sections 20 due to the thrust from the piston rod and due to expansion of the piston by heat, may all be exerted simultaneously but, in order to show the flexing characteristics of the strut, operational thrusts at right angles to and parallel to the wrist pin axis are indicated by the arrows $t_1$ and $t_2$ in Figs. 5 and 6, and the expansion thrusts are indicated by the arrows $t_3$, $t_4$ and $t_5$ in Fig. 7. Since the four supporting struts 21 are substantially identical in form and symmetrically disposed, they are subjected to equal expansion thrusts and have the same flexing characteristics.

In Figs. 5, 6 and 7 the line $a$—$b$ represents a radial plane through the median line $c$ of the juncture of a strut 18 with a post 9. It will be seen that the inner curved portion 25 of the strut extends away from the plane $a$—$b$ near the line of juncture with the post 9 and crosses the plane $a$—$b$ inwardly of the juncture of the strut with the skirt section, and that the median line of the juncture between the strut 21 and the skirt section 20 is spaced a substantial distance from the plane $a$—$b$ on the side thereof toward the wrist pin axis.

The inner curved portion 25 of the strut is preferably curved uniformly to a radius which equals the distance from the flat outer portion 24 of the strut to the side face 12 of the post 10. Since the outer portion of the strut is substantially flat, it follows that the radius of curvature of the portion 25 is materially less than the width of the strut measured parallel to the wrist pin axis.

Referring to Fig. 5 it will be apparent that the thrust $t_1$ exerted upon the inner end of the strut 21 is transmitted to the skirt 20 through the outer portion 24 of the strut, setting up a counterthrust along the outer edge of the portion 24 at right angles thereto which tends to move the outer portion 24 of the strut toward the wrist pin axis, flexing the strut in such manner as to swing the portion 24 about an axis near its inner end, thereby moving the edge of the skirt to which the strut is attached radially inwardly.

Referring to Fig. 6, it will be apparent that the thrust indicated by the arrow $t_2$ is transmitted through the strut 21 and skirt 20 to a position of the cylinder wall inclined to the straight portion 24 of the strut, and that there will be a considerable component of such thrust due to the inclination of the cylinder wall that will tend to bend the portion 24 of the strut toward the wrist pin axis. It will be apparent that operational thrusts, whether at right angles to or parallel to the wrist pin axis, are cushioned by the strut 24, so that in normal operation the piston bearing sections have substantially full engagement with the cylinder wall and misalinements or loose bearings will have a minimum harmful effect upon the piston because of the universal yieldability of the struts 24.

Referring to Fig. 7, it will be apparent that the thrusts $t_3$ and $t_4$ due to expansion of the piston correspond to the operational thrusts $t_1$ and $t_2$ and that the tangential thrust $t_5$ due to expansion of the skirt section increases the force acting upon the outer edge of the strut 21 that tends to bend the same toward the wrist pin axis and deflect the edge of the skirt section radially inwardly.

The cumulative action of the operational and expansion thrusts is to deflect the outer end of the strut 21 toward the wrist pin axis and the effect of such deflection is to relieve the pressure on the portion of the skirt section adjacent the connection between the outer end of the strut and the skirt section and to equalize the pressure throughout the bearing area of the skirt section.

Since the struts are connected to the post and to the skirt sections along lines substantially parallel to the piston axis and, since the flexing characteristics of the struts are uniform from end to end, deflection of the skirt sections angularly with respect to the piston axis is prevented, and substantially full engagement of the skirt bearing surfaces from the inner to the outer end of the skirt is maintained.

By reason of the compensating action of the struts, the portions of the skirt sections that are joined to the struts have slight radial yieldability under any stress to which the skirt may be subjected in service regardless of whether the piston is cold or hot and lateral thrusts are distributed over large bearing areas without permitting appreciable rocking movements of the piston in the cylinder.

By reason of the lack of side play of the piston in the cylinder, the piston will operate satisfactorily with fewer piston rings and additional rings on the lower end of the skirt such as are often provided to increase the bearing area are usually not needed.

Because of the full and continuous engagement of the skirt bearing faces with the cylinder walls it has been found to be advantageous to provide bearing zones 26 and 27 along the top and bottom edges of the skirt and a recessed zone 28 between the bearing zones 26 and 27.

Since portions of the skirt sections in the middle zone are out of contact with the cylinder wall it is impossible for the piston to fulcrum on bearing points in the middle zone and consequently wear on both the piston and on the cylinder wall is decreased. The restriction of the skirt bearing surfaces to the ends of the skirt sections does not interfere with efficient heat transfer because of the full engagement of the bearing surfaces at all temperatures of operation. The recessed zone 28 serves not only to reduce frictional wear, but also provides an oil retaining space which assists in maintaining a film of oil on the cylinder wall.

It is usually advantageous to slightly taper the skirt toward the head to compensate for the greater expansion of the head.

The provision of symmetrically arranged elongated struts providing uniform flexibility throughout their length not only insures full engagement of the skirt bearing faces and a substantially uniform distribution of radial pressure on the skirt faces, but also provides a convenient means for providing the optimum yieldability for pistons made of alloys having different coefficients of expansion and for pistons of different sizes.

A piston for a given engine must be accommodated to certain predetermined dimensions such as cylinder and wrist pin diameters and width of piston rod bearings. Other dimensions such as skirt thickness, area of skirt bearing faces and dimensions of the skirt supports may be varied within restricted limits, but permissible variations in any of these dimensions do not alter the operating characteristics of the piston sufficiently to provide a satisfactory control of flexibility.

It has been found that in applicants' piston the ratio of the radius of curvature of the inner end portion 25 of the strut (dimension Y in Fig. 7) to the width of the strut measured in the direction of the wrist pin axis (dimension A in Fig. 7) can be conveniently varied through a fairly wide range and that variations in this strut arm ratio have a marked effect on the operating characteristics of the piston.

In connection with a large number of tests of pistons ranging from two and one-quarter inches to four and one-quarter inches in diameter, the strut arm ratio was plotted against piston diameters and it was found that the pistons which operated satisfactorily for long periods of time were in a zone on the chart the center line of which was approximately the line represented by the equation $$\frac{A}{Y} = 4 - .9r$$

where $r$ is the radius of the piston. However, the zone within which the ratios are satisfactory is of substantial width, variations of as much as twenty per cent from the equation being permissible.

This equation has been found to be convenient for the range of sizes specified, which includes a large majority of automotive engines.

The piston of the present invention is constructed to provide enough flexibility to permit the use of aluminum alloys commonly employed in permanent mold cast pistons for internal combustion engines, but it is desirable, in order to improve the operation of the piston and in order to increase the range of strut arm ratios providing satisfactory pistons, to employ a metal that is inherently more flexible than the metal of aluminum piston castings heretofore preferred.

Increased flexibility in aluminum casting alloys is incident to increased ductility and the ductility of casting alloys such as used for pistons may be increased by suitable heat treatment. Such increase in ductility, which is usually accompanied by a decrease in hardness, is indicated by a considerable increase in the difference between the tensile and yield strengths of the metal.

It has been found, however, that the operating and wear resisting qualities of pistons of the present invention are not adversely affected by a decrease in hardness substantially below the hardness ordinarily employed in pistons. This is probably due to the relatively large area of bearing contact provided between the skirt and cylinder wall.

It has been found desirable to provide an aluminum piston alloy which has an elongation at normal temperatures of more than 1% in two inches and preferably from 1.2% to 1.5% or even 2% or more in two inches.

In the manufacture of aluminum alloy pistons, it is common practice to give the pistons an aging treatment at a relatively low temperature, such as 375° F. for a long period of time such as 18 to 24 hours, to minimize growth of the piston at elevated temperatures with increase in hardness.

Heat treatments commonly given to pistons such as the heat treatment above described result in a casting which is relatively rigid and which has a yield strength approaching that of the tensile strength and an elongation so low that it is not susceptible to accurate measurement.

In a piston constructed in accordance with the teaching of the present invention greater flexibility is desired, and the ductility of the casting preferably increased by aging the casting at a relatively high temperature, such as 500° to 600° F. for a relatively short period of time, such as 6 to 12 hours. This treatment serves to eliminate growth of the casting at elevated temperatures and also has the effect of substantially increasing the flexibility of the metal.

The heat treatment employed for pistons of the present invention results in a casting which has relatively high elongation and a much wider spread between the yield and tensile strengths.

The structure of the piston of the present invention is designed to provide flexibility, but the special heat treatment recommended is highly desirable since the mechanical flexibility together with the flexibility of the metal makes it possible to vary the dimensions of the strut and skirt to obtain more strength with a given flexibility or more flexibility with a given strength.

*Example 1.*—As an example of an aluminum alloy which is suitable for making pistons in accordance with this invention is the alloy known as "Y" alloy or alloy 142 as described on page 831 of the 1948 edition of "Metals Handbook" published by the American Society for Metals. A permanent mold casting made of this alloy may be heat treated to give it sufficient tensile strength and yield strength for use at elevated temperatures such as encountered in internal combustion engines and yet the casting will have more than 1% and up to 1.5% or 2% or so elongation in two inches.

*Example 2.*—Another example of an aluminum alloy suitable for making pistons in accordance with this invention is an alloy having the following compositition: silicon, 8.5 to 11%; nickel, .5 to 1%; magnesium, .5 to 1.5%; copper, 2 to 4%; manganese, .3 to .8%; iron, 1% maximum; zinc, 1% maximum; titanium, .2% maximum; other elements, .05% maximum for each and .5% maximum total; the remainder being aluminum. When castings of this alloy are properly made in a permanent mold of this alloy and given heat treatment for 6 to 12 hours at a temperature between 500° and 600° F., such castings will have suitable tensile and yield strengths for service as a piston and will have an elongation of more than 1% and up to 1.5 or so in two inches.

Pistons were cast in a permanent mold from the alloy of Example 2 and given an aging heat treatment of 8 hours at 540° F. These pistons when tested had a tensile strength which averaged 30,640 lbs. per square inch and a yield strength which averaged 17,150 lbs. per square inch. The average Brinell hardness was 85.4 (500 kg. load and 10 mm. ball) and the elongation was 1.2% in two inches.

When pistons cast in a permanent mold from the alloy in Example 2 were given an aging heat treatment of 8 hours at 440° F., which is similar to that ordinarily given to permanent mold castings, these pistons had a tensile strength which averaged 32,500 lbs. per square inch and a yield strength which averaged 25,000 lbs. per square inch. The Brinell hardness averaged 108 and the elongation was about .5% in 2 inches.

It should be noted that the heat treatment first described provided piston castings which are much more flexible than the castings receiving the reat treatment ordinarily given to such castings, both the elongation and the spread between the yield and tensile strengths being greatly increased. The yield strength and elongation can be varied by varying the temperature and the time of treatment. The yield strength of the piston casting should be sufficient to resist permanent deformation in service and it is preferred to provide the metal of the casting with a yield strength at room temperatures of at least 12,000 lbs. per square inch. In order to provide the casting with the yieldability desirable for the piston of the present invention, it is preferred that the heat treatment be such as to provide a tensile strength at least 50% greater than the yield strength.

The alloy of Example 1 is frequently used in pistons for airplane engines and is known to have a relatively high thermal expansion. The alloy of Example 2 has a relatively low thermal expansion. Both of these alloys, however, if heat treated to give them the rigidity and hardness heretofore desired, do not have the high flexibility desired for pistons of the present invention.

The piston of the present invention provides the skirt supporting struts 21 which are designed to flex sufficiently to enable the piston to conform to the interior of the cylinder within which it operates at various operating temperatures without binding, and such limited flexing does not have a harmful effect upon the metal of the struts. However, under very severe operating conditions such as may occur in high speed, high compression engines, the operational thrusts tending to rock the piston on the wrist pin axis may cause flexure of the struts that is sufficiently excessive to have a harmful effect upon the metal of the struts. It is, therefore, desirable to provide means for limiting the amplitude of flexure of the struts under excessive operational thrusts in pistons to be used in such engines.

Figures 8 to 13 show auxiliary bracing members interposed between the lateral edges of the skirt sections 20 and the rigid bearing posts 10, these bracing members being effective to limit the flexure of the struts 21 toward the adjacent bearing posts under excessive lateral thrusts and being so constructed and arranged that they do not appreciably interfere with the flexing of the struts and skirt sections that is necessary to enable the piston to conform to the cylinder without binding at various operating temperatures. It is desirable that the bracing members be a permanent part of the piston as cast and they are preferably formed of a resilient metal having a higher melting point than the metal of the piston and of such size and shape that they may be readily held in place in the mold by the mold core members.

Figs. 8 and 9 show a reinforcement in the form of an endless band 30 having straight parallel side portions 31 that extend through the thickened portions 14 of the posts above the wrist pin openings and at right angles to the plane of the piston and wrist pin axes. The reinforcing band also has arcuate end portions 32 that fit against the interior of the skirt portions 20 of the piston. The side portions 31 of the band provide four brace bars that extend across the spaces between the lateral edges of the skirt sections 20 and the side faces of the bearing posts 10 and that are disposed perpendicular to the plane of the piston and wrist pin axes to resist lateral thrusts and to limit the inward flexing of the struts. The positioning of the brace bars in the piston mold is facilitated by making them part of an endless band, which can easily be held in proper position in the mold by the core members. The straight portions 31 of the band are firmly anchored against slippage within the thickened portions 14 of the posts 10 and may be provided with notches 33 to firmly anchor them to the posts. The straight portions 31 of the band serve to resist impact thrusts and the reiliency of the band provides some cushioning action. Since the band is not anchored either to the struts or to the skirt sections, it does on appreciably hinder the slight flexing of the struts necessary to enable the piston to accommodate itself without binding to the engine cylinder at various operating temperatures.

Figs. 10 and 11 show a reinforcement in the form of two U-shaped resilient metal members 34 showing straight ends 35 that serve as brace bars extending across the spaces between the lateral edges of the skirt sections and the bearing posts above the wrist pin axis. The members 34 have arcuate portions 36 embedded in the skirt sections along the top edges thereof. The straight end portions 35 are disposed at right angles to the plane of the piston and wrist pin axis and effectively resist operational thrusts but, being anchored to the skirt only, do not interfere with expansion of the piston by heat or with the slight flexing necessary to permit the piston skirt to accommodate itself to the engine cylinder at different operating temperatures.

Figs. 12 and 13 show a reinforcing band 37 that has straight parallel side portions 38 that are embedded in the thickened portions 14 of the bearing posts 10 and that extend at right angles to the plane of the piston and wrist pin axes, the straight portions 38 providing four brace bars extending across the spaces between the bearing posts and the lateral edges of the skirt sections. The band also has arcuate end portions 39 that are embedded in the metal of the skirt sections. Since the band is formed of resilient metal such as steel wire, it has the resiliency and lateral flexibility to permit the normal expansion and contraction of the piston and the flexing of the struts and skirt sections necessary to enable the piston to conform to the interior of the engine cylinder without binding at various operating temperatures. The straight portions 36 of the band are embedded throughout a major portion of their length in the posts 10 and are firmly anchored against slippage in the posts 10. In order to insure against slippage of the embedded portion of the band in the posts, the bands may be roughened by sand blasting before the casting operation.

Aluminum alloy pistons coming within the present invention may be cast in sand molds, permanent molds, or combinations thereof. Permanent molds are preferred where the shape of the pistons permits their use.

It is to be understood that in accordance with the provisions of the patent statutes, variations and modifications of the specific devices herein shown and described may be made without departing from the spirit of the invention.

What we claim is:

1. A cast light metal alloy piston comprising a head, a pair of rigid axially elongated bearing posts integral with the head on opposite sides of the piston axis and provided with axially alined wrist pin openings, said posts extending parallel to the piston axis and being of uniform width from said head to below said openings, a pair of substantially identical relatively rigid arcuate skirt sections spaced from said head and disposed one on each side of the plane of the piston and wrist pin axes, a pair of elongated resiliently flexible struts connecting each of said skirt sections to said posts, said struts being substantially identical in form, longitudinally straight and transversely curved, said struts being of substantially uniform transverse section and extending parallel to the piston axis above and below said wrist pin openings and throughout the major portion of the length of the skirt and being joined throughout their length at their inner edges to opposite sides of said posts and throughout their length at their outer edges to said skirt sections, said struts being joined to said posts and skirt sections along lines substantially parallel to the piston axis, said struts being of less thickness than the posts in any section transverse to the piston axis, the line of connection of the outer edge of each strut to a skirt section being located between the plane of the piston and wrist pin axes and a plane of the piston axis which contains midpoints of the connection between the inner edge of the strut and the bearing post.

2. A piston as defined in claim 1 in which the external faces of said skirt sections have circumferentially alined axially spaced bearing zones adjacent the top and bottom edges of said sections, said faces being recessed intermediate said bearing zones.

3. A piston such as defined in claim 1 composed of an aluminum alloy having physical qualities suitable for pistons of internal combustion engines, said piston being in the form of a permanent mold casting heat treated to increase its flexibility, the metal of said casting having an elongation at normal room temperatures greater than one per cent in two inches.

4. A piston such as defined in claim 1 composed of an aluminum alloy having physical qualities suitable for pistons of internal combustion engines, said piston being in the form of a permanent mold casting having relatively high flexibility, the metal of said casting having at normal room temperatures a yield strength of more than twelve thousand pounds per square inch in two inches, and a tensile strength at least fifty per cent higher than its yield strength.

5. A cast light metal alloy piston having a head, rigid bearing posts projecting from the head on opposite sides of the piston axis and parallel thereto, said posts being of uniform width and having centrally disposed alined wrist pin openings, said posts being radially thick from said head to below said wrist pin openings and having relatively wide side faces disposed substantially parallel to the plane of the piston and wrist pin axes, relatively flexible struts of uniform width and of less thickness than the posts joined along their inner edges to opposite sides of the posts, said struts being of substantially identical size and shape and extending parallel to the piston axis, and two skirt sections spaced from the head, one on each side of the plane of the piston and wrist pin axes, said skirt sections forming segments of a cylinder of slightly greater diameter than the head and being integrally joined to the outer edges of said struts, the inner and outer edges of said struts being joined to said posts and said skirt sections throughout their length along lines parallel to the piston axis and said struts being of substantially uniform transverse section and extending along lines parallel to the piston axis from the inner end of the skirt to adjacent the outer end thereof, the outer portions of said struts being disposed substantially parallel to said post side faces and the inner portions of said struts being curved toward the wrist pin axis to dispose the inner edge portions thereof substantially at right angles to the wrist pin axis.

6. A cast light metal alloy piston having a head, rigid bearing posts on opposite sides of the piston axis and having inner faces parallel to one another and to the piston axis, said posts being of uniform width and having centrally disposed alined wrist pin openings, said posts being radially thick from said head to below said wrist pin openings and having relatively wide side faces disposed substantially parallel to the plane of the piston and wrist pin axes, relatively flexible struts of substantially uniform transverse section and of less thickness than the posts joined along their inner edges to opposite sides of the posts, said struts being of substantially identical size and shape and extending parallel to the piston axis, and two substantially identical skirt sections spaced from the head, said skirt sections forming segments of a cylinder of slightly greater diameter than said head and being integrally joined to the outer edges of said struts, the inner edges of said struts being integrally joined to said posts adjacent the inner faces thereof along lines parallel to the piston axis and the outer edges of said struts being integrally joined to said skirt sections along lines parallel to the piston axis, said struts extending from adjacent the inner end of the skirt to adjacent the outer end thereof, the outer portion of each strut being substantially flat and substantially parallel to said post side faces, the inner portion of each strut being curved on a radius substantially equal to the width of the space between the flat portion thereof and the adjacent side faces of the bearing post to which it is attached.

7. A piston such as defined in claim 6 in which the ratio of the radius of curvature of the inner end of each strut to the width of the strut measured in the plane of the piston and wrist pin axes approximates four minus nine-tenths of the piston radius.

8. A cast light metal alloy piston having a head provided with a continuous circumferential ring belt flange, rigid bearing posts on opposite sides of the piston axis having inner faces parallel to one another and to the piston axis, said posts being integral with the said flange and with the body of the head inwardly of the flange, the portions of the post projecting beyond said flange being of uniform width and having centrally disposed alined wrist pin openings, each post having relatively wide side faces on opposite sides of its wrist pin opening that are substantially parallel to the plane of the piston and wrist pin axes, relatively flexible struts of substantially uniform transverse section and of less thickness than the posts integrally joined along their inner edges to opposite sides of the posts adjacent the inner faces thereof along lines parallel to the piston axis, said struts being of substantially identical size and shape and extending parallel to the piston axis, and two substantially identical skirt sections spaced from one another and from the head, said skirt sections forming segments of a cylinder of slightly greater diameter than said head and being integrally joined to the outer edges of said struts, the inner and outer edges of said struts being integrally joined to said posts and said skirt sections throughout their length and said struts extending from adjacent the inner end of the skirt to adjacent the outer end thereof, the outer portion of each strut being substantially flat and substantially parallel to said post side faces, the inner portion of each strut being curved on a radius substantially equal to the width of the space between the flat portion thereof and the adjacent bearing post side face.

9. A cast light metal alloy piston comprising a head, a pair of rigid bearing posts integral with said head on opposite sides of the piston axis and having alined wrist pin openings, each of said posts having side faces on opposite sides of its opening and parallel to the axis of its wrist pin opening and to the piston axis, two arcuate skirt sections separated from said head and positioned on opposite sides of the wrist pin axis with their lateral edges parallel to and spaced from said side faces of said posts, the two skirt sections having bearing faces that conform to arcs of a cylinder, four resiliently flexible elongated struts having inner edges substantially parallel to the piston axis and integrally connected to the side faces of said posts and outer edges substantially parallel to their inner edges and integrally connected to the lateral edges of said skirt sections, each strut having a curved inner portion and an outer portion extending inwardly from said skirt sections and substantially parallel to said post side faces, and means for limiting the flexure of said struts under operational thrusts tending to move a skirt section toward the wrist pin axis comprising resilient laterally flexible metal brace bars, one extending across the space between each of the lateral edges of the skirt sections and the adjacent post side face, said brace bars being substantially perpendicular to the post side faces and above the wrist pin openings.

10. A piston such as defined in claim 10 in which said brace bars are parts of an endless metal band having parallel side portions that extend through the bearing posts and across the spaces between the posts and the lateral edges of the skirt sections.

References Cited in the file of this patent

UNITED STATES PATENTS

| | | |
|---|---|---|
| 1,571,185 | Cover et al. | Feb. 2, 1926 |
| 1,600,558 | Morrow | Sept. 21, 1926 |
| 1,766,449 | Nelson | June 24, 1930 |
| 1,853,450 | Norton | Apr. 12, 1932 |
| 1,891,419 | Jardine | Dec. 20, 1932 |
| 2,044,087 | Long | June 16, 1936 |
| 2,062,624 | Welty | Dec. 1, 1936 |
| 2,097,570 | Long | Nov. 2, 1937 |
| 2,136,822 | Moore | Nov. 15, 1938 |
| 2,139,271 | Jardine | Dec. 6, 1938 |
| 2,141,784 | Day | Dec. 27, 1938 |

FOREIGN PATENTS

| | | |
|---|---|---|
| 399,853 | Great Britain | Oct. 16, 1933 |
| 887,977 | France | Nov. 29, 1943 |